United States Patent
Zha et al.

(10) Patent No.: US 10,903,929 B2
(45) Date of Patent: Jan. 26, 2021

(54) FLEXIBLE ETHERNET GROUP ESTABLISHMENT METHOD AND DEVICE

(71) Applicant: Huawei Technologies Co., Ltd., Shenzhen (CN)

(72) Inventors: Min Zha, Shenzhen (CN); Sen Zhang, Shenzhen (CN); Jing Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/413,193

(22) Filed: May 15, 2019

(65) Prior Publication Data

US 2019/0280797 A1 Sep. 12, 2019

Related U.S. Application Data

(63) Continuation of application No. PCT/CN2017/109768, filed on Nov. 7, 2017.

(30) Foreign Application Priority Data

Nov. 15, 2016 (CN) .......................... 2016 1 1024658

(51) Int. Cl.
*H04J 14/02* (2006.01)
*H04Q 11/00* (2006.01)
(Continued)

(52) U.S. Cl.
CPC .......... *H04J 14/0209* (2013.01); *H04J 3/065* (2013.01); *H04J 3/1658* (2013.01);
(Continued)

(58) Field of Classification Search
CPC ...... H04J 14/0209; H04J 3/065; H04J 3/1658; H04Q 11/0062; H04Q 2011/0064; H04Q 2011/0083; H04L 12/407
(Continued)

(56) References Cited

U.S. PATENT DOCUMENTS 10,673,782 B2 * 6/2020 Gareau ................... H04L 49/35
2007/0198898 A1 8/2007 Ysebaert et al.
(Continued)

FOREIGN PATENT DOCUMENTS

CN 101026569 A 8/2007
CN 101141350 A 3/2008
(Continued)

OTHER PUBLICATIONS

Hussain et al., "FlexE GMPLS Signaling Extensions, draft-hussain-ccamp-flexe-signaling-extensions-00," Internet Engineering Task Force, Reston, Virginia (Jul. 7, 2016).
(Continued)

*Primary Examiner* — Faisal Choudhury
(74) *Attorney, Agent, or Firm* — Leydig, Voit & Mayer, Ltd.

(57) ABSTRACT

This application discloses a flexible Ethernet group establishment method and a device. The method includes: determining that there are at least M physical layer PHY links; receiving at least M delay test requests sent by a near-end device; determining, by the far-end device, at least M receiving time points at which the at least M delay test requests are received; and determining M PHY links used to establish a flexible Ethernet group, from the at least M PHY links based on the at least M receiving time points, where a delay difference between any two of the M PHY links satisfies a preset delay condition. According to the method in this application, the delay difference between the any two PHY links is accurately determined based on time points at which delay test requests are received over any two PHY links.

20 Claims, 11 Drawing Sheets

(51) Int. Cl.
*H04L 12/407* (2006.01)
*H04J 3/06* (2006.01)
*H04J 3/16* (2006.01)

(52) U.S. Cl.
CPC ........ *H04J 14/0213* (2013.01); *H04L 12/407* (2013.01); *H04Q 11/0062* (2013.01); *H04Q 2011/0064* (2013.01); *H04Q 2011/0083* (2013.01)

(58) Field of Classification Search
USPC .......................................................... 370/252
See application file for complete search history.

(56) References Cited

U.S. PATENT DOCUMENTS

| | | | |
|---|---|---|---|
| 2016/0323164 A1 | 11/2016 | Cao | |
| 2017/0005742 A1* | 1/2017 | Gareau | ................. H04J 3/1658 |
| 2017/0093757 A1* | 3/2017 | Gareau | ............... H04L 43/0864 |
| 2018/0375800 A1* | 12/2018 | Gareau | ............... H04L 43/0858 |

FOREIGN PATENT DOCUMENTS

| | | |
|---|---|---|
| CN | 102136959 A | 7/2011 |
| CN | 102427426 A | 4/2012 |
| CN | 103546336 A | 1/2014 |
| CN | 105141558 A | 12/2015 |
| EP | 3013017 A1 | 4/2016 |
| EP | 3089423 A1 | 11/2016 |
| WO | 2008092390 A1 | 8/2008 |
| WO | 2009021376 A1 | 2/2009 |
| WO | 2015106386 A1 | 7/2015 |

OTHER PUBLICATIONS

Mills et al., "Network Time Protocol (NTP)," Network Working Group, RFC958 (Sep. 1985).

"Flex Ethernet Implementation Agreement," IA OIF-FLEXE-01.0, Optical Internetworking Forum, Fremont, California (Mar. 2016).

Wang, "RSVP-TE Signaling Extensions in support of Flexible Ethernet networks draft-wang-ccamp-flexe-signaling-02," XP5542453, Internet-Draft, Internet Engineering Task Force (Jul. 8, 2017).

* cited by examiner

FLEXIBLE ETHERNET GROUP ESTABLISHMENT METHOD AND DEVICE

CROSS-REFERENCE TO RELATED APPLICATIONS

This application is a continuation of International Application No. PCT/CN2017/109768, filed on Nov. 7, 2017, which claims priority to Chinese Patent Application No. 201611024658.1, filed on Nov. 15, 2016. The disclosures of the aforementioned applications are hereby incorporated by reference in their entireties.

TECHNICAL FIELD

This application relates to the field of flexible Ethernet, and more specifically, to a flexible Ethernet group establishment method and a device.

BACKGROUND

A concept of flexible Ethernet (FlexE) is proposed in the Flexible Ethernet Implementation Agreement published by the Optical Internetworking Forum (OIF) in April, 2016. Specifically, in the FlexE, several Ethernet physical layer (PHY) links are used to establish a flexible Ethernet group (FlexE Group) to support functions for Ethernet services, for example, bonding, sub-rating, and channelization.

A delay difference between any two candidate PHY links needs to be measured before a FlexE group is established, so as to determine whether a requirement on the delay difference is satisfied, and use PHY links that satisfy the requirement on the delay difference to establish one FlexE group.

Network Time Protocol (NTP) is a protocol designed specifically for time synchronization between different computers in a network. For specific description of the NTP, refer to the standard RFC-958. The NTP can be used to test delays of links between two devices (for example, a near-end device and a far-end device). However, a prerequisite for testing transmission delays of PHY links by using the NTP is that uplink and downlink transmission paths are symmetric. During actual application, the FlexE group can allow asymmetric uplink and downlink transmission paths on PHY links; and therefore, a delay difference between the PHY links on which uplink and downlink transmission paths are asymmetric cannot be accurately tested by using the NTP. Consequently, the FlexE group cannot be accurately or effectively established.

SUMMARY

This application provides a flexible Ethernet group establishment method and a device, to establish a flexible Ethernet group. This can ensure a decrease in service failure of a flexible Ethernet group.

According to a first aspect, a flexible Ethernet group establishment method is provided, including: determining, by a far-end device, that there are at least M physical layer PHY links, where M is an integer greater than or equal to 2; receiving, by the far-end device over the at least M PHY links, at least M delay test requests sent by a near-end device, where one delay test request sent by the near-end device is received over each of the at least M PHY links, and an delay test request is received over a PHY link i of the at least M PHY links; determining, by the far-end device, at least M receiving time points at which the at least M delay test requests are received, where a time point at which the $i^{th}$ delay test request is received is a receiving time point $T_{1i}$; and determining, by the far-end device, M PHY links used to establish a flexible Ethernet group, from the at least M PHY links based on the at least M receiving time points, where a delay difference between any two of the M PHY links: a PHY link a and a PHY link b, satisfies a preset delay condition.

According to the flexible Ethernet group establishment method in the first aspect, the delay difference between the any two PHY links is accurately determined based on time points at which delay test requests are received over the any two PHY links. The method can be applicable to a case in which uplink and downlink transmission paths are asymmetric, can be used to establish a flexible Ethernet group, and can ensure a decrease in service failure of the flexible Ethernet group.

With reference to the first aspect, in a first possible implementation of the first aspect, at least two of the at least M delay test requests are sent by the near-end device at different sending time points.

With reference to the first possible implementation of the first aspect, in a second possible implementation of the first aspect, the $i^{th}$ delay test request includes first information, the first information is used to indicate a sending time point $T_{2i}$ at which the near-end device sends the $i^{th}$ delay test request over the PHY link i, and the delay difference $\Delta D_{ab}$ between the PHY link a and the PHY link b is determined based on a formula $$\Delta D_{ab} = (T_{1b} - T_{2b}) - (T_{1a} - T_{2a}).$$

With reference to the first aspect, in a third possible implementation of the first aspect, the at least M delay test requests are sent by the near-end device at a same sending time point.

With reference to the third possible implementation of the first aspect, in a fourth possible implementation of the first aspect, the delay difference $\Delta D_{ab}$ between the PHY link a and the PHY link b is determined based on a formula $\Delta D_{ab} = T_{1b} - T_{1a}$. The possible implementation requires that a plurality of PHY links be used to send delay test requests at a same sending time point. This can simplify a process of calculating a delay difference between the PHY links.

With reference to any one of the first aspect or the first to the fourth possible implementations of the first aspect, in a fifth possible implementation of the first aspect, the $i^{th}$ delay test request is carried on a management channel block in a flexible Ethernet FlexE overhead on the PHY link i.

With reference to any one of the first aspect or the first to the fourth possible implementations of the first aspect, in a sixth possible implementation of the first aspect, the $i^{th}$ delay test request is carried on a data block on the PHY link i.

With reference to the fifth aspect of the first aspect or the sixth possible implementation of the first aspect, in a seventh possible implementation of the first aspect, a FlexE overhead in a FlexE overhead frame transmitted on the PHY link i includes group establishment status information, and the group establishment status information is used to indicate whether the flexible Ethernet group has been established by using the PHY link i.

With reference to any one of the first aspect or the first to the seventh possible implementations of the first aspect, in an eighth possible implementation of the first aspect, the method further includes: sending, by the far-end device, second information to the near-end device, where the second information is used to instruct to use the M PHY links as one flexible Ethernet group; and establishing, by the far-end device, the flexible Ethernet group with the near-end device based on the M PHY links.

According to a second aspect, a far-end device is provided, including a first determining module, a receiving module, a control module, and a second determining module that are configured to implement corresponding functions of the terminal in the foregoing aspect. Functions of the modules may be implemented by using hardware or by executing corresponding software by hardware. The far-end device may further include a sending module and an establishment module, to implement corresponding implementations.

According to a third aspect, a far-end device is provided, including a processor and a network interface that are configured to implement corresponding functions of the far-end device in the foregoing aspects. Functions of the components may be implemented by using hardware or by executing corresponding software by hardware. The far-end device may further include a memory.

According to a fourth aspect, a computer readable storage medium is provided, where the computer readable storage medium is configured to store program code used for the flexible Ethernet group establishment method, and the program code is used to execute instructions for the method in the first aspect.

DESCRIPTION OF EMBODIMENTS

Figure 1:
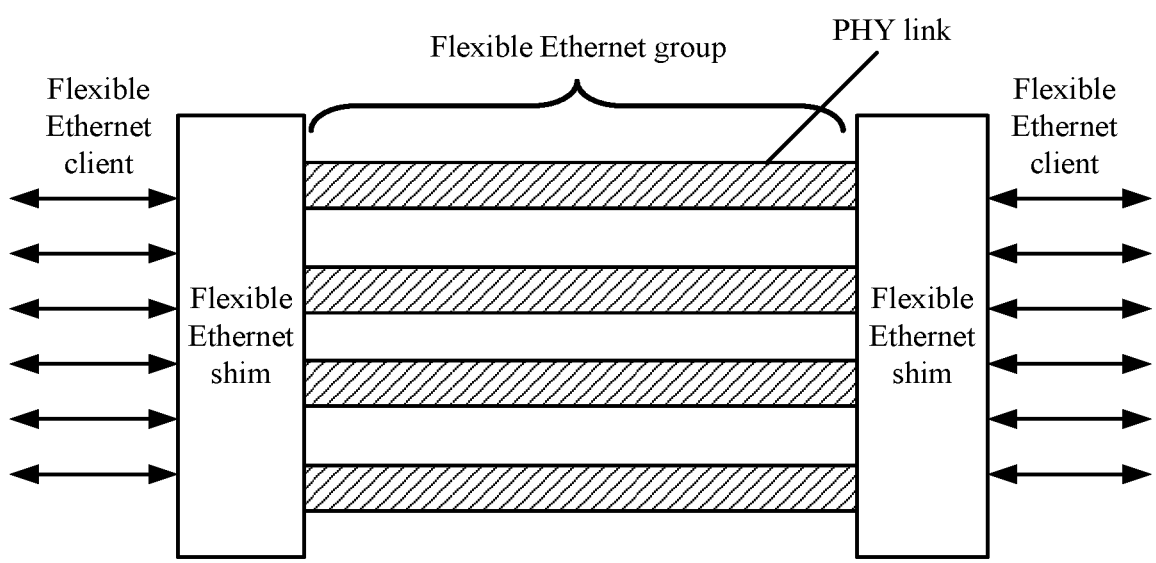
FIG. 1 is a schematic diagram of a specific architecture of FlexE.

The following describes technical solutions of the embodiments in this application with reference to accompanying drawings.

The Institute of Electrical and Electronics Engineers (IEEE) defined an 802.3-based Ethernet interface, to serve as a service interface. Since then, Ethernet has been widely used and rapidly developed for quite a long period of time in the past. A rate of the Ethernet interface is increased tenfold, from 10 Mbps to 100 Mbps, 1000 Mbps (1 Gbps), 10 Gbps, 40 Gbps, 100 Gbps, and 400 Gbps. With the development of technologies, requirements of various scenarios on a bandwidth granularity differ increasingly greatly, resulting in a relatively great difference between existing Ethernet and an actual application requirement expectation. Specifically, a bandwidth required by a mainstream application is not increased tenfold. For example, the bandwidth required by the mainstream application includes 50 Gbps, 75 Gbps, 200 Gbps, or the like. If transmission at a granularity of 50 Gbps is performed at a granularity of 100GE, resources are wasted; for 200 Gbps, currently, there is no corresponding Ethernet granularity to carry; and the like. Therefore, support for Ethernet ports (virtual connections) with bandwidths of 50 Gbps, 60 Gbps, 75 Gbps, 200 Gbps, 150 Gbps, and the like is desired in the industry.

Some Ethernet ports with flexible bandwidths are desired in the industry. These Ethernet ports can share one or several Ethernet physical interfaces. For example, two 40GE ports and two 10GE ports share one 100 G physical interface. For another example, a rate of an Ethernet port can be adjusted flexibly as a requirement changes, for example, from 200 Gbps to 330 Gbps or from 50 Gbps to 20 Gbps, to improve use efficiency of the Ethernet port or prolong service life of the Ethernet port. Physical layer links with a fixed rate may be cascaded and bonded to support a stacking increase in logical-port rate (for example, two 100GE physical interfaces are stacked, cascaded, and bonded to support a 200GE logical port). In addition, bandwidth resources obtained by flexibly stacking physical interfaces can be pooled, and bandwidths of the resources are assigned to specified Ethernet logical ports according to a granularity (for example, a granularity of 5 GB), so that several Ethernet virtual connections efficiently share a stacked and cascaded physical layer link group.

In this specification, an Ethernet port usually appears as a concept in data logic, and is referred to as a logical port or simply a port; an Ethernet physical interface appears as a concept in hardware, and is referred to as a physical interface or simply an interface.

A concept of flexible Ethernet (FlexE) is proposed in the Flexible Ethernet Implementation Agreement published by the Optical Internetworking Forum (OIF) in April, 2016. Specifically, in the FlexE, several Ethernet physical layer (PHY) links are used to establish a flexible Ethernet group (FlexE Group), and a general mechanism supporting different Ethernet Media Access Control (, MAC) rates is provided, to support functions of Ethernet services such as bonding, sub-rating, and channelization.

The MAC rate provided by the FlexE may be greater than a rate of a single PHY link (which is implemented through bonding), or may be less than a rate of a single PHY link (which is implemented through sub-rating and channelization). For example, for a bonding scenario of an Ethernet service, a 200 G Ethernet service (a MAC data stream) can be transferred at an existing 2-path 100GE physical medium dependent sublayer (Physical Medium Dependent, PMD). For a sub-rating application scenario of an Ethernet service, a 50 G Ethernet service can be transferred at an existing 1-path 100GE PMD sublayer. For a channelization scenario of Ethernet services, several logical ports can share one or more physical interfaces, and one 150 G Ethernet service and two 25 G Ethernet services can be transferred at an existing 2-path 100GE PMD layer.

FIG. 1 is a schematic diagram of a specific architecture of existing FlexE. FlexE is a group including K bonded PHY links, where a value of K is a positive integer. A FlexE group shown in FIG. 1 includes four PHY links. The current Flexible Ethernet Implementation Agreement supports only a 100 G PHY link. In the future, a 400 G FlexE PHY link can be supported after the standard for 400GE is improved by IEEE P802.3bs. A flexible Ethernet client (FlFlexE Client) is a MAC-based Ethernet data flow. A FlexE client rate may be the same as or different from an existing Ethernet PHY link rate, and is, for example, 10 Gb/s, 40 Gb/s, or 25 Gb/s. A flexible Ethernet shim (FlexE Shim) is a logical layer that maps FlexE client data into a FlexE group, and demaps FlexE client data from the FlexE group. Similar to a technology of a multi-link gearbox (Multi-Link Gearbox, MLG), the FlexE shim has a function of multiplexing in a transmission direction, to be specific, maps FlexE client data into the FlexE group; conversely, the FlexE shim has a function of demultiplexing in a receiving direction, to be specific, demaps FlexE client data from the FlexE group.

Figure 2:
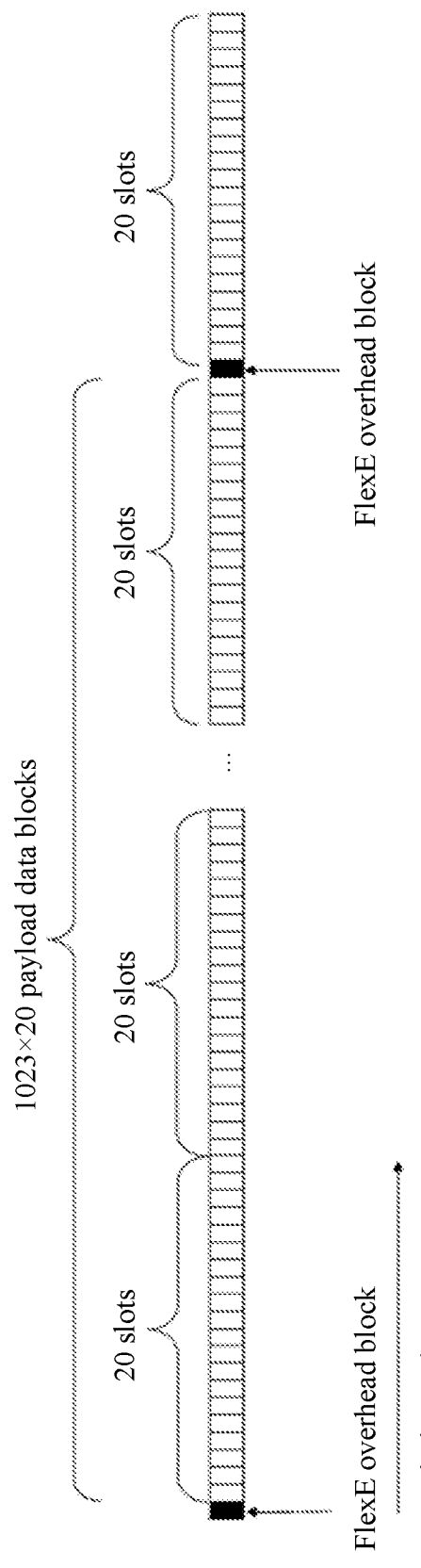
FIG. 2 is a schematic diagram of a block on a PHY link.

With reference to a Synchronous Digital Hierarchy (SDH)/Optical Transport Network (OTN) technology, the FlexE builds a fixed-frame format for physical-interface transmission, and performs time division multiplexing (TDM) slot division. FIG. 2 is a schematic diagram of a block on a PHY link according to an embodiment of this application. Different from the SDH/OTN, according to a transmission order, a granularity for TDM slot division in the FlexE is 66 bits which can correspondingly carry one 64B/66B encoded block. Alignment of data on FlexE PHY links is implemented by periodic insertion of FlexE overheads. Specifically, one 66B FlexE overhead block is inserted every 1023×20 66B data blocks, as shown in FIG. 2. For a scenario of a 100 G PHY link, a FlexE overhead block occurs once per 13.1 microseconds.

A FlexE frame is divided into an overhead frame and a multiframe. One FlexE overhead frame includes eight rows. A first 66B block in each row is a FlexE overhead block, followed by a payload area for slot division (1023×20 66B payload data blocks). Using 100GE as an example, a bandwidth of a 100GE interface is divided for 20 slots, and a bandwidth of each slot is approximately 5 Gbps. 32 overhead frames form one multiframe.

Figure 3:
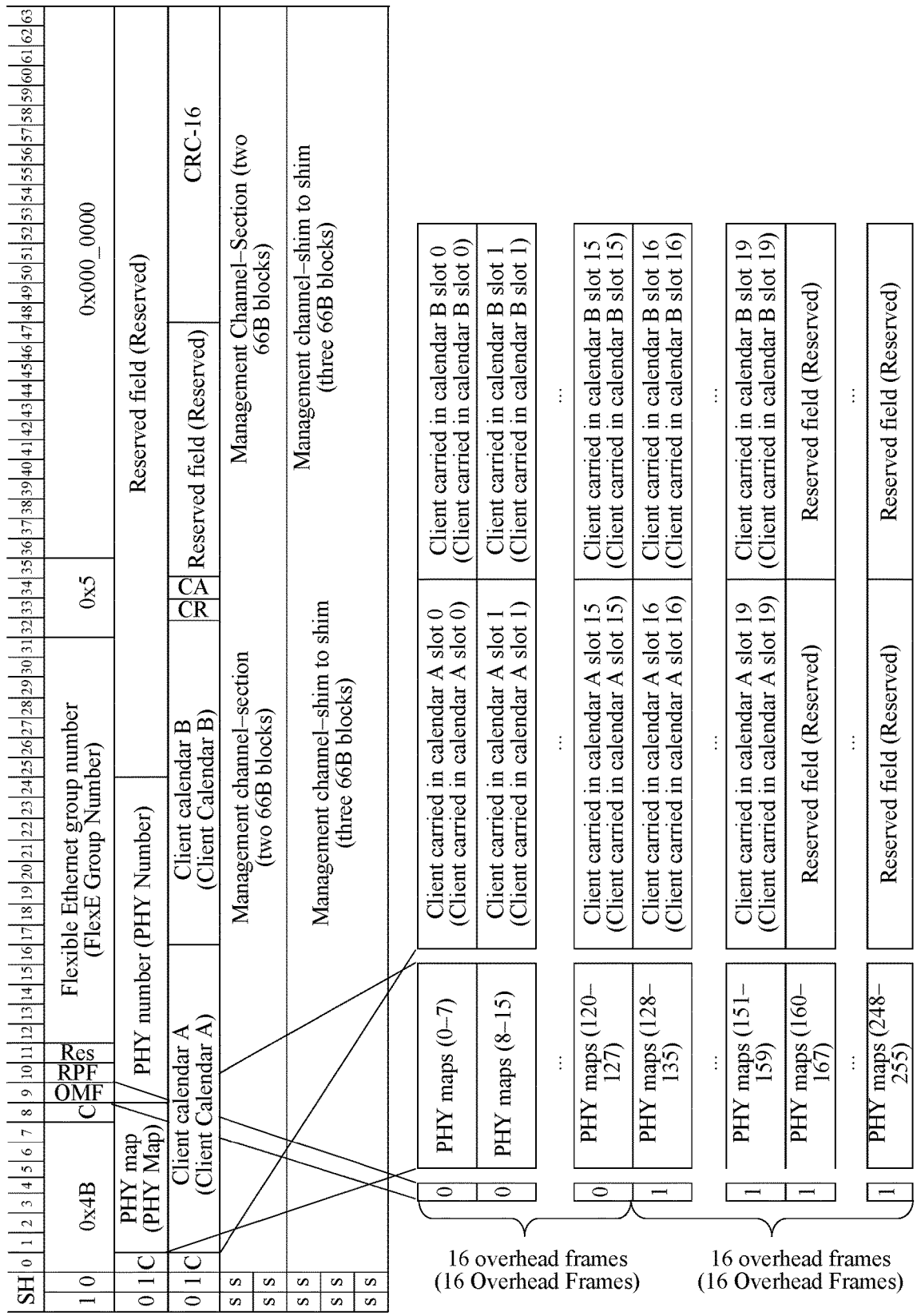
FIG. 3 is a schematic diagram of an overhead block in a FlexE overhead frame.

FIG. 3 is a schematic diagram of an overhead block in a FlexE overhead frame according to an embodiment of this application. It can be seen from FIG. 3 that the overhead block includes some fields used for specified indications. For example, field C is used to indicate a calendar configuration in use (calendar configuration in use). OMF is an overhead multiframe indicator. RPF is a remote PHY fault. Res and Reserved are reserved fields. PHY Map is used for control of which PHY links are members of this group (control of which PHYs are members of this group). PHY Number is an identity of this PHY within the group (Identity of this PHY within the group). CR is calendar switch request for short. CR is calendar switch acknowledge for short. ss is valid synchronization header bits, including two bits, where the two bits may be 01 or 10. CRC is Cyclic Redundancy Check for short. It can be seen from FIG. 3 that in the current overhead block, there are still some reserved fields, and five 66B blocks are used as a management channel used to transmit information different from a data payload between two FlexE devices.

To ensure that data of the FlexE group can be recovered correctly on a receive side, a delay difference generated after the data from a transmit side is transmitted over PHY links needs to be within a specified range. If the delay difference is excessively great, when the data is received over the FlexE PHY link, data transmission of the entire FlexE group becomes faulty because a block alignment marker cannot be found. An upper limit of the delay difference defined in FlexE 1.0 provided by the OIF is 10 microseconds. Therefore, a delay difference between any two candidate PHY links needs to be measured before a FlexE group is established, so as to determine whether a requirement on the delay difference is satisfied, and use PHY links that satisfy the requirement on the delay difference to establish one FlexE group.

Figure 4:
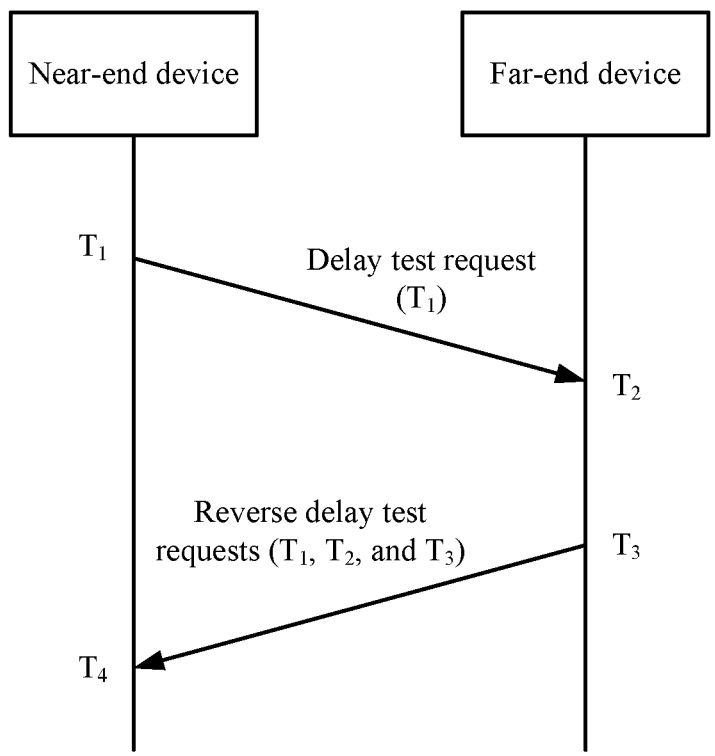
FIG. 4 is a schematic diagram of a working principle of measuring delays of links between two devices by using an NTP.

Network Time Protocol (NTP) is a protocol designed specifically for time synchronization between different computers in a network. For specific description of the NTP, refer to the standard RFC-958. The NTP can be used to test delays of links between two devices. FIG. 4 is a schematic diagram of a working principle of measuring delays of links between two devices (a near-end device and a far-end device) by using the NTP.

Assuming that the delay difference between the near-end device and the far-end device is $\Delta T$, that a delay of transmission from the near-end device to the far-end device is d1, that a delay of transmission from the far-end device to the near-end device is d2, and that uplink and downlink transmission are symmetric, d2 and d1 are equal and are D. The following process may be used to measure the delay difference between the near-end device and the far-end device.

The near-end device sends a delay test request to the far-end device. The near-end device records a time point at which the delay test request is sent, as a timestamp $T_1$ of the near-end device, and puts the timestamp $T_1$ in the delay test request.

The far-end device receives the delay test request sent by the near-end device. The far-end device records a time point at which the far-end device receives the delay test request, as a timestamp $T_2$ of the far-end device.

The far-end device sends a reverse delay test request to the near-end device. The far-end device records a time point at which the reverse delay test request is sent, as a timestamp $T_3$ of the far-end device, and puts the timestamp $T_1$, the timestamp $T_2$, and the timestamp $T_3$ in the reverse delay test request.

The near-end device records a time point at which the reverse delay test request sent by the far-end device is received, as a timestamp $T_4$ of the near-end device.

In this case, the near-end device obtains the four timestamps: the timestamp $T_1$, the timestamp $T_2$, the timestamp $T_3$, and the timestamp $T_4$. The near-end device calculates the delay difference $\Delta T$ between the near-end device and the far-end device based on the four timestamps. A specific formula is as follows:

$$T_2 = T_1 + \Delta T + D$$

$$T_4 = T_3 - \Delta T + D$$

$$\Delta T = [(T_2 - T_1) + (T_3 - T_4)]/2$$

Delay differences between the PHY links are tested by using the foregoing method, and PHY links that satisfy a delay difference requirement are used to establish one FlexE group.

However, a prerequisite for testing transmission delays of PHY links by using the NTP is that uplink and downlink transmission paths are symmetric. During actual application, the FlexE group can allow asymmetric uplink and downlink transmission paths on PHY links; therefore, a delay difference between the PHY links on which uplink and downlink transmission paths are asymmetric cannot be accurately tested by using the NTP. Consequently, the FlexE group cannot be accurately or effectively established.

Figure 5:
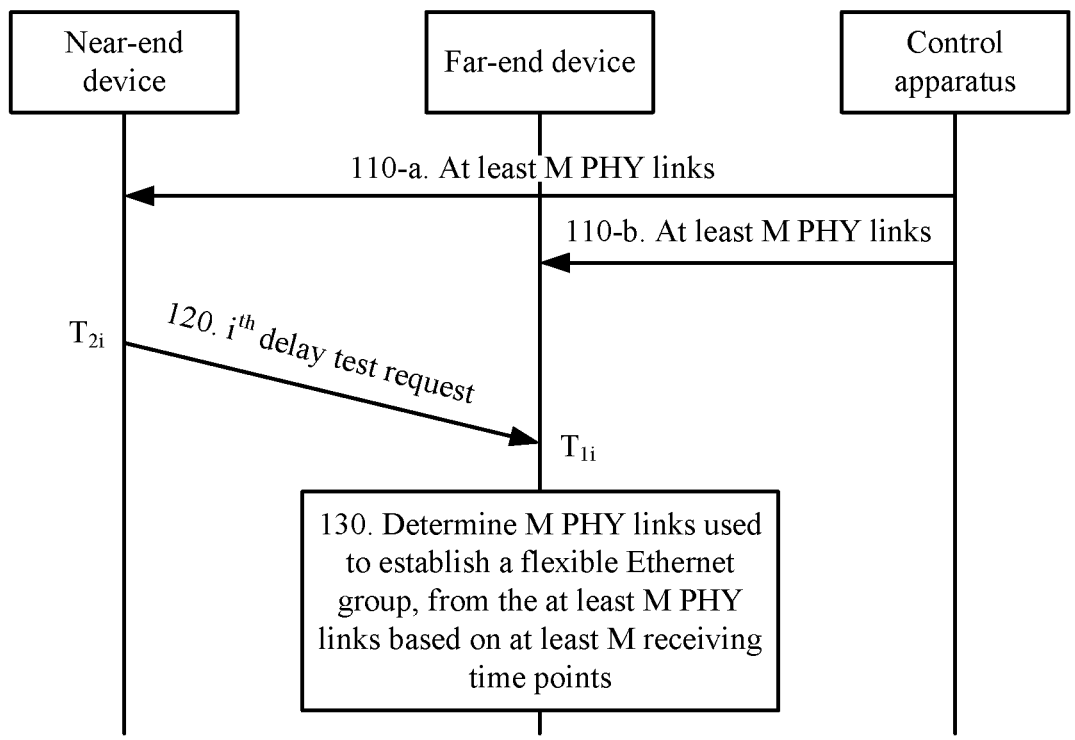
FIG. 5 is a schematic flowchart of a flexible Ethernet group establishment method according to an embodiment of this application.

Based on the foregoing problem, an embodiment of this application provides a flexible Ethernet group establishment method 100. Certainly, based on the idea of this embodiment of this application, a similar method may be applied to a flexible optical network to establish a FlexO group. FIG. 5 is a schematic flowchart of a flexible Ethernet group establishment method 100 according to an embodiment of this application. The method 100 is used to establish a FlexE group in a transmission direction from a near-end device to a far-end device. The method 100 may include the following steps.

110. The far-end device and the near-end device separately determine that there are at least M physical layer PHY links, where M is an integer greater than or equal to 2.

To establish a flexible Ethernet group including M PHY links between the near-end device and the far-end device, it needs to be determined that there are at least M available PHY links. The at least M PHY links may be N candidate PHY links. The N candidate PHY links are N candidate PHY links used to establish the flexible Ethernet group. The N candidate PHY links are usually PHY links of ports from a same FlexE shim. A specific port finding implementation may be based on an existing technology, and details are not described herein.

The N candidate PHY links may be determined and selected by a control apparatus, or may be determined by another apparatus or device. The control apparatus may be deployed in a device independent of the far-end device and the near-end device, or may be deployed in the far-end device or the near-end device. This is not limited in this embodiment of this application.

The control apparatus is configured to control working statuses of the far-end device and the near-end device. The control apparatus is configured to manage all PHY links in the transmission direction from the near-end device to the far-end device; and can determine the N candidate PHY links used to establish the flexible Ethernet group, and notify the determined N PHY links to the far-end device and the near-end device. For example, in 110-a, the control apparatus sends a message to the near-end device to notify the at least M PHY links (the N candidate PHY links) to the near-end device; and in 110-b, the control apparatus sends a message to the far-end device, to notify the at least M PHY links (the N candidate PHY links) to the far-end device.

It should be understood that the foregoing solution is a specific implementation. Alternatively, the far-end device and the near-end device may separately determine the at least M PHY links by using another solution. This is not limited in this embodiment of this application.

120. The near-end device sends at least M delay test requests to the far-end device over at least M PHY links, and correspondingly the far-end device receives, over the at least M PHY links, the at least M delay test requests sent by the near-end device, where the near-end device sends an $i^{th}$ delay test request over a PHY link i of the at least M PHY links, and the far-end device receives one delay test request sent by the near-end device over each of the at least M PHY links, and receives the $i^{th}$ delay test request over the PHY link i of the at least M PHY links, where i is a variable.

For the far-end device, the far-end device needs to determine at least M receiving time points at which the at least M delay test requests are received, where a time point at which the $i^{th}$ delay test request is received is a receiving time point $T_{1i}$. It should be understood that the receiving time point $T_{1i}$ is a timestamp based on a clock of the far-end device.

For the near-end device, in a first solution, at least two of the at least M delay test requests are sent by the near-end device at different sending time points. The near-end device may add, to any to-be-sent delay test request, a timestamp indicating a sending time point of the delay test request. To be specific, the $i^{th}$ delay test request includes first information. The first information is used to indicate a sending time point $T_{2i}$ at which the near-end device sends the $i^{th}$ delay test request over the PHY link i. It should be understood that the sending time point $T_{2i}$ is a timestamp based on a clock of the near-end device.

In a second solution, the at least M delay test requests are sent by the near-end device at a same sending time point. To be specific, that the near-end device sends at least M delay test requests to the far-end device over at least M PHY links may include: sending, by the near-end device, the at least M delay test requests at the same sending time point over the at least M PHY links. In this case, the $i^{th}$ delay test request may not need to include information used to indicate the sending time point $T_{2i}$ at which the near-end device sends the $i^{th}$ delay test request over the PHY link i. The far-end device directly considers that sending time points of the at least M delay test requests are the same. During subsequent processing, values of all $T_{2i}$ may be equal, or values of all $T_{2i}$ are directly 0. A specific solution is described in detail in the following.

It should be understood that, in this embodiment of this application, another solution may alternatively be used, so that the far-end device learns of the sending time points of the at least M delay test requests. This is not limited in this embodiment of this application.

130. The far-end device determines M PHY links used to establish a flexible Ethernet group, from the at least M PHY links based on the at least M receiving time points, where a delay difference between any two of the M PHY links: a PHY link a and a PHY link b, satisfies a preset delay condition.

Specifically, the far-end device determines delay differences between every two of the at least M PHY links based on the at least M receiving time points, so as to determine, from the at least M PHY links, the at least M PHY links used to establish the flexible Ethernet group. The far-end device determines the delay difference between the PHY link a and the PHY link b based on a receiving time point $T_{1a}$ and a receiving time point $T_{1b}$, where values of both a and b are 1, 2, . . . , and N, and the values of a and b are different.

In the first solution, that the far-end device determines the delay difference between the PHY link a and the PHY link b based on the receiving time point $T_{1a}$ and the receiving time point $T_{1b}$ may include: determining the delay difference between the PHY link a and the PHY link b based on a sending time point $T_{2a}$, the receiving time point $T_{1a}$, a sending time point $T_{2b}$, and the receiving time point $T_{1b}$. Specifically, the delay difference $\Delta D_{ab}$ between the PHY link a and the PHY link b may be determined based on the following formula:

$$\Delta D_{ab} = (T_{1b} - T_{2b}) - (T_{1a} - T_{2a}).$$

In the second solution, values of all $T_{2i}$ may be equal, or values of all $T_{2i}$ are directly 0. Therefore, the delay difference $\Delta D_{ab}$ between the PHY link a and the PHY link b may be determined based on the following formula:

$$\Delta D_{ab} = T_{1b} - T_{1a}.$$

After all the delay differences between every two of the at least M PHY links are determined, the M PHY links that can be used to establish the flexible Ethernet group may be determined from the at least M PHY links based on the delay differences and the preset delay condition, and the flexible Ethernet group is established based on the M PHY links. The second solution requires that a plurality of PHY links be used to send delay test requests at a same sending time point. This can simplify a process of calculating a delay difference between the PHY links.

The far-end device determines, from the at least M PHY links based on the delay differences between every two PHY links and the preset delay condition, the M PHY links that can be used to establish the flexible Ethernet group.

Specifically, the preset delay condition may be preset based on experience, a configuration or running status of a system, or a service requirement. The preset delay condition may be that a delay difference between two PHY links is less than a delay difference allowable threshold, that a delay difference between two PHY links falls within a delay difference allowable range, or the like. The preset delay condition may change as a system or service changes. This is not limited in this embodiment of this application.

The far-end device may determine one or more FlexE groups from the at least M PHY links based on the delay differences and the preset delay condition. For example, the far-end device may determine, from the at least M PHY links, the M PHY links that satisfy the preset delay condition, as a first FlexE group; and determine, from the at least M PHY links, K PHY links that satisfy the preset delay condition, as a second FlexE group.

It should be understood that an order of S120 and S130 is determined according to functions and internal logic thereof. For example, the delay test requests may be sent over some PHY links; after a delay difference is measured, if the M PHY links used to establish the flexible Ethernet group can be found from the measured PHY links, subsequent measurement may no longer be performed. This is not limited in this embodiment of this application.

According to the flexible Ethernet group establishment method in this embodiment of this application, the delay difference between the any two PHY links is accurately determined based on time points at which delay test requests are received over any two PHY links. The method can be applicable to a case in which uplink and downlink transmission paths are asymmetric on the PHY link, can be used to establish a flexible Ethernet group, and can ensure a decrease in service failure of the flexible Ethernet group.

Figure 6:
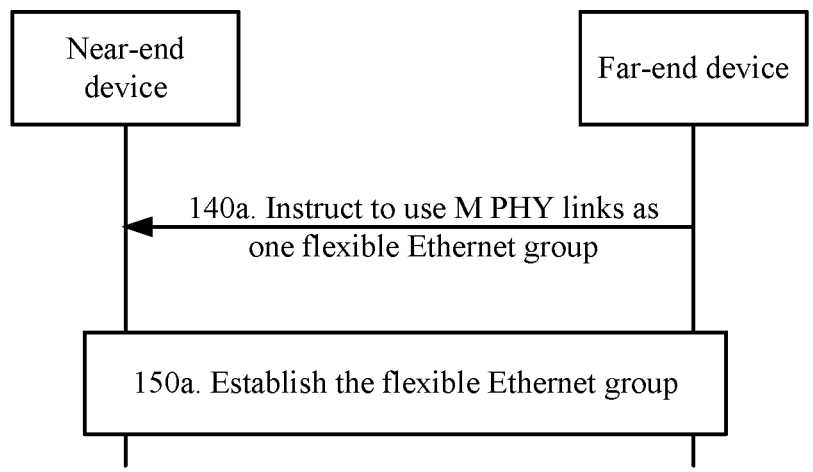
FIG. 6 is a schematic flowchart of a flexible Ethernet group establishment method according to another embodiment of this application.

FIG. 6 is a schematic flowchart of a flexible Ethernet group establishment method according to an embodiment of this application. After 130, an optional solution is shown in FIG. 6. The method 100 may further include the following steps:

140a. The far-end device sends second information to the near-end device, where the second information is used to instruct to use the M PHY links as one flexible Ethernet group. The second information may be carried on an overhead block in a FlexE overhead frame, or may be sent to the near-end device in another manner. This is not limited in this embodiment of this application. A specific carrying manner is described in detail in the following.

150a. The far-end device establishes the flexible Ethernet group with the near-end device based on the M PHY links. Data may be transmitted between the far-end device and the near-end device by using the flexible Ethernet group.

Figure 7:
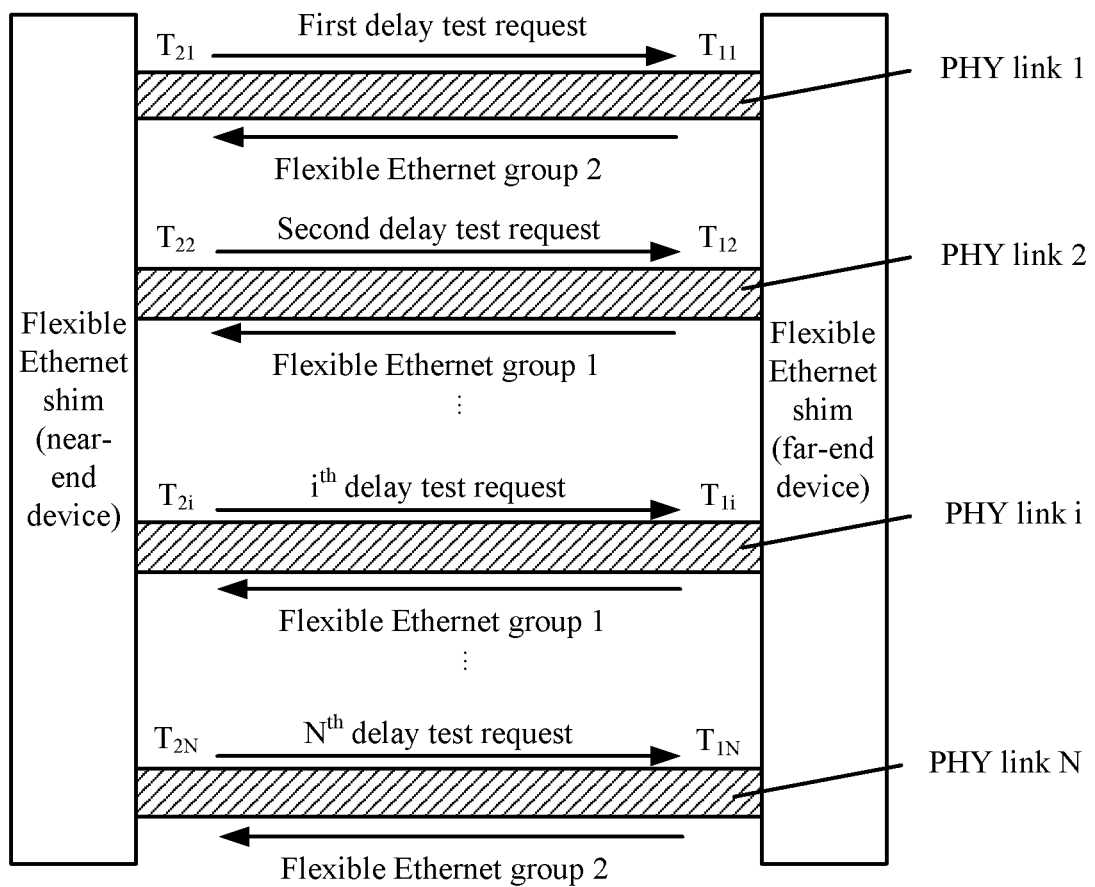
FIG. 7 is a schematic flowchart of a flexible Ethernet group establishment method according to another embodiment of this application.

FIG. 7 is a schematic flowchart of a flexible Ethernet group establishment method according to another embodiment of this application. The following describes, from another perspective with reference to FIG. 7, the solution described in FIG. 6.

It is assumed that there are N PHY links between a near-end device and a far-end device. The near-end device sends N delay test requests to the far-end device on the N PHY links. An $i^{th}$ delay test request is transmitted on a PHY link i, a sending time point of the $i^{th}$ delay test request is $T_{2i}$, and a receiving time point of the $i^{th}$ delay test request is $T_{1i}$.

Steps of establishing a FlexE group may be as follows:

The near-end device and the far-end device use all PHY links between ports from a same FlexE shim as candidate PHY links, to be specific, a total of N candidate PHY links.

Timestamps at which the near-end device sends delay test requests on the PHY links are recorded as $T_{21}$, $T_{22}$, ..., $T_{2i}$, ..., and $T_{2N}$, and are put in the delay test requests. Within a specified time range S, the near-end device sends all N delay test requests on all the PHY links. A value of S may be usually determined based on a frequency stability of a clock of the near-end device and a frequency stability of a clock of the far-end device. Frequencies of the clock of the near-end device and the clock of the far-end device become more stable as an external factor (for example, temperature or voltage) changes; in this case, a larger value of S is allowed.

The far-end device receives, over the N PHY links, the N delay test requests sent by the near-end device. The far-end device records timestamps at which the delay test requests are received, as $T_{11}$, $T_{12}$, ..., $T_{1i}$, ..., and $T_{1N}$. In addition, the far-end device separately obtains the N delay test requests through parsing and saves timestamps $T_{21}$, $T_{22}$, ..., $T_{2i}$, ..., and $T_{2N}$ in the N delay test requests.

The far-end device determines the delay difference $\Delta D_{ab}$ between any two PHY links, for example, a PHY link a and a PHY link b, based on the following formula:

$$\Delta D_{ab} = (T_{1b} - T_{2b}) - (T_{1a} - T_{2a}), \text{ where}$$

both a and b may be PHY numbers in the FlexE group.

When $T_{2a}$ is equal to $T_{2b}$, the delay difference $\Delta D_{ab}$ between the PHY link a and the PHY link b may be simplified as the following formula:

$$\Delta D_{ab} = T_{1b} - T_{1a}.$$

The far-end device compares the calculated delay differences between every two PHY links with a preset delay condition, and assigns a same group identity Group ID to PHY links that satisfy the preset delay condition. For example, N=4, there are four candidate PHY links: a PHY link A, a PHY link B, a PHY link C, and a PHY link D.

It is learned, by testing the calculated delay difference by using the method in this embodiment of this application, that the PHY link A and the PHY link D satisfy the preset delay condition of the FlexE group, and the PHY link B and the PHY link C satisfy the preset delay condition of the FlexE group, but the four candidate PHY links together do not satisfy the preset delay condition of the FlexE group. In this case, two FlexE groups can be established. A group whose group ID is flexible Ethernet group 1 includes the PHY link B and the PHY link C, and a group whose group ID is flexible Ethernet group 2 includes the PHY link A and the PHY link D.

The far-end device may encode a group ID into a specified block, add the specified block to a management channel in a FlexE overhead block on each PHY link, and send the management channel to the near-end device. The group ID herein may be considered as second information. A specific implementation agreement for information about a timestamp at which the near-end device sends the delay test request is described in detail in the following. An implementation agreement for sending the group ID by the far-end device is also described in detail in the following.

To reduce an error caused by frequency stability of the clock of the near-end device and frequency stability of the clock of the far-end device onto testing of the delay difference, the foregoing step of testing the delay difference may be repeated for a plurality of times to obtain an average value of measurement results.

Figure 8:
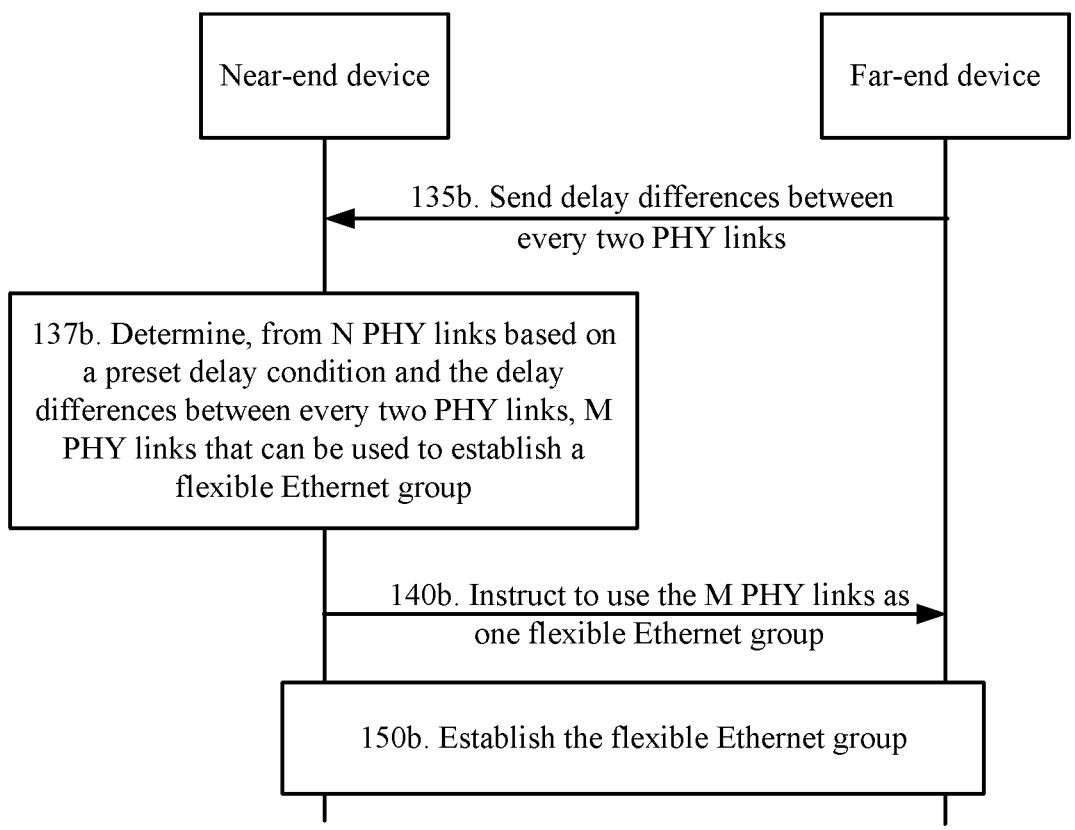
FIG. 8 is a schematic flowchart of a flexible Ethernet group establishment method according to another embodiment of this application.

FIG. 8 is a schematic flowchart of a flexible Ethernet group establishment method according to another embodiment of this application. After 110, 120, and 130 in which the far-end device determines delay differences between every two of the at least M PHY links based on the at least M receiving time points in the method 100, an optional solution is shown in FIG. 8. The method 100 may further include the following steps:

135*b*. The far-end device sends the calculated delay differences between every two PHY links to the near-end device. A specific manner of sending the delay differences is not limited in this embodiment of this application.

137*b*. The near-end device determines, from the at least M PHY links based on a preset delay condition and the delay differences between every two PHY links, M PHY links that can be used to establish a flexible Ethernet group.

140*b*. The near-end device sends second information to the far-end device, where the second information is used to instruct to use the M PHY links as one flexible Ethernet group.

150*b*. The far-end device establishes the flexible Ethernet group with the near-end device based on the M PHY links. Data may be transmitted between the far-end device and the near-end device by using the flexible Ethernet group.

Figure 9:
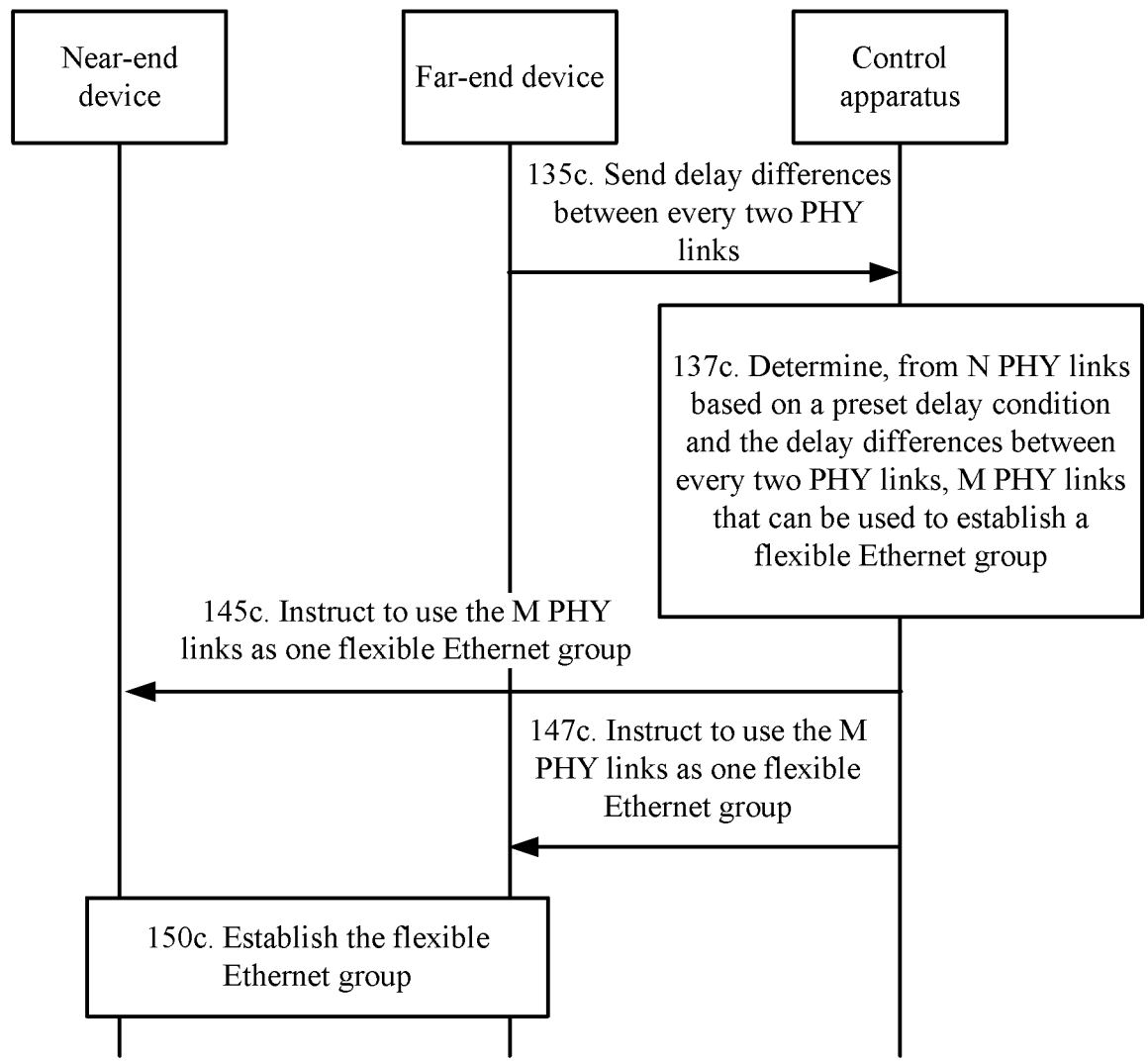
FIG. 9 is a schematic flowchart of a flexible Ethernet group establishment method according to another embodiment of this application.

FIG. 9 is a schematic flowchart of a flexible Ethernet group establishment method according to another embodiment of this application. After 110, 120, and 130 in which the far-end device determines delay differences between every two of the at least M PHY links based on the at least M receiving time points in the method 100, an optional solution is shown in FIG. 9. The method 100 may further include the following steps:

135*c*. The far-end device sends the calculated delay differences between every two PHY links to a control device. A specific manner of sending the delay differences is not limited in this embodiment of this application.

137*c*. The control device determines, from the at least M PHY links based on a preset delay condition and the delay differences between every two PHY links, M PHY links that can be used to establish a flexible Ethernet group.

145*c*. The control device sends second information to the near-end device, where the second information is used to instruct to use the M PHY links as one flexible Ethernet group.

147*c*. The control device also sends second information to the far-end device, where the second information is used to instruct to use the M PHY links as one flexible Ethernet group.

150*c*. The far-end device establishes the flexible Ethernet group with the near-end device based on the M PHY links. Data may be transmitted between the far-end device and the near-end device by using the flexible Ethernet group.

Optionally, in an embodiment, an $i^{th}$ delay test request may be carried on a management channel block in a flexible Ethernet FlexE overhead on a PHY link i.

Figure 10:
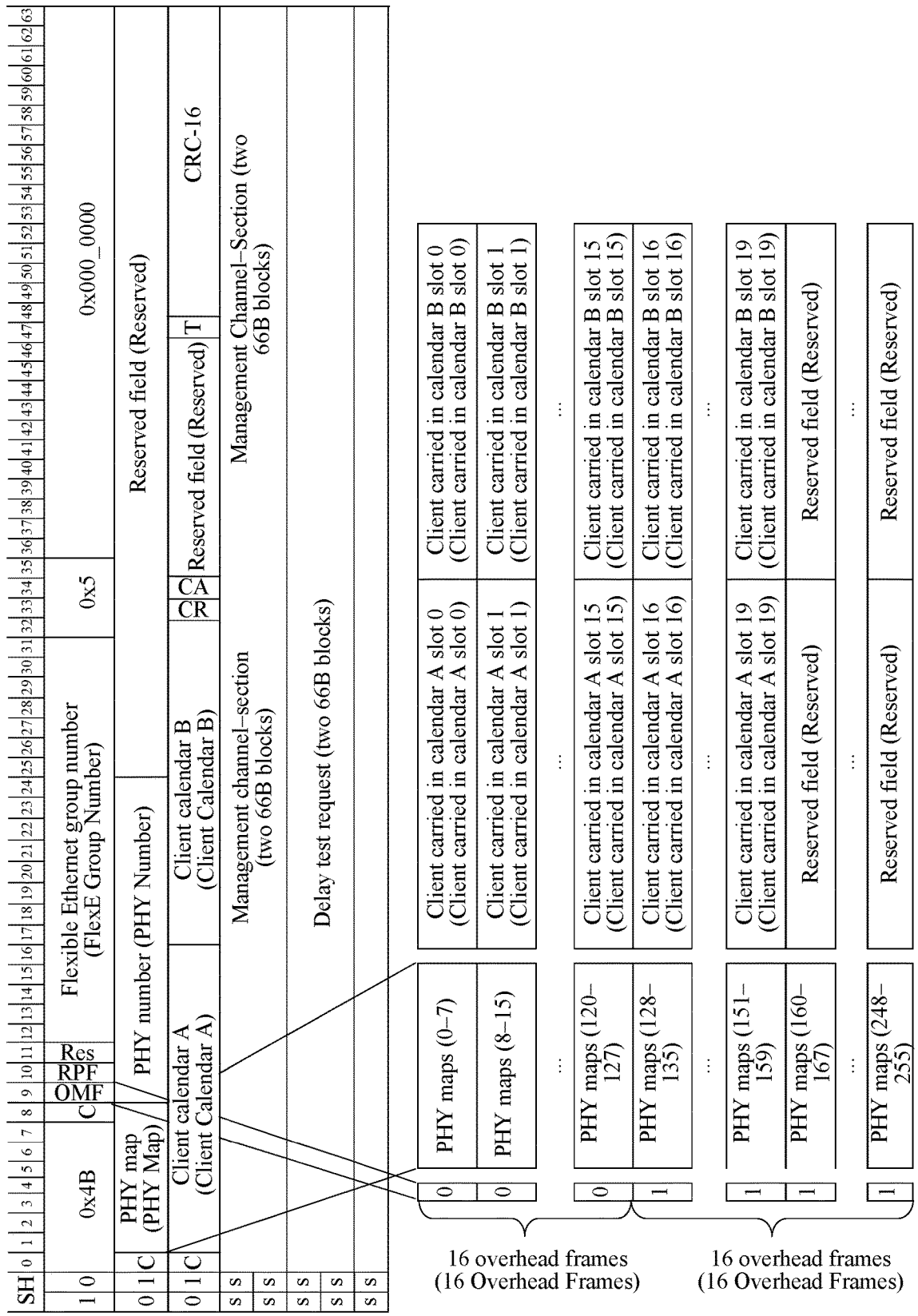
FIG. 10 is a schematic diagram of a structure of an overhead block in a FlexE overhead frame according to an embodiment of this application.

Specifically, it can be seen, from a structure of overhead blocks in a FlexE overhead frame shown in FIG. 3, that some reserved fields in the overhead blocks are not defined yet. As shown in FIG. 10, the delay test request sent by the near-end device may be put in a specified position in the FlexE overhead in a format of a TLV (Type, Length, Value) triple, for example, on a management channel block, to be specific, the $6^{th}$ and the $7^{th}$ 66B blocks of the management channel. It should be understood that the delay test request may alternatively be put in another block or field of the FlexE overhead. This is not limited in this embodiment of this application.

For the first solution described above, the delay test request sent by the near-end device may include a timestamp. For the second solution described above, the delay test request sent by the near-end device does not need to include a timestamp.

Optionally, in an embodiment, a FlexE overhead in a FlexE overhead frame transmitted on the PHY link i includes group establishment status information, and the group establishment status information is used to indicate whether the flexible Ethernet group has been established by using the PHY link i.

Specifically, a one-bit field (for example, a field that may be named T temporarily) may be added to a reserved field of the FlexE overhead to indicate the group establishment status information, to be specific, to indicate whether the FlexE group has been established. For example, T being 0 indicates that the FlexE group is not established, and T being 1 indicates that the FlexE group has been established. If an initial state of T is set to that the FlexE group is not established, the $6^{th}$ and the $7^{th}$ 66B blocks of the management channel of the FlexE overhead are used to transmit the delay test request. If the FlexE group has been established, T is changed to 1, and the $6^{th}$ and the $7^{th}$ 66B blocks of the management channel of the FlexE overhead are no longer used to transmit the delay test request. A specific position of T may be shown in FIG. 10, or T may be in another position. This is not limited in this embodiment of this application.

A slight modification to an existing FlexE transmission mechanism is made in the manner of transmitting the delay test request on the management channel of the FlexE overhead. In the method in this embodiment of this application, a new Flex group may be further established by adding a new PHY link to an existing Flex group. The process does not affect a service on a PHY link that works normally. When the new PHY link is added to the existing FlexE group, a delay difference between the new PHY link and each existing PHY link is also measured according to the step of establishing a FlexE group in the embodiments of this application. In the test process, the delay test request needs to be sent on each PHY link according to the method described in the embodiments of this application.

Optionally, in an embodiment, an $i^{th}$ delay test request is carried on a data block on the PHY link i.

In the previous embodiment, the delay test request may be carried on the management channel block of the FlexE overhead. Because the 66B blocks of the FlexE overhead are periodically inserted between FlexE data blocks, a transmission rate of an overhead block is less than that of a data block. Before the FlexE group is established, no service data is transmitted yet on the data block on the PHY link. Therefore, in this embodiment, the delay test request may be carried on the data block.

Figure 11:
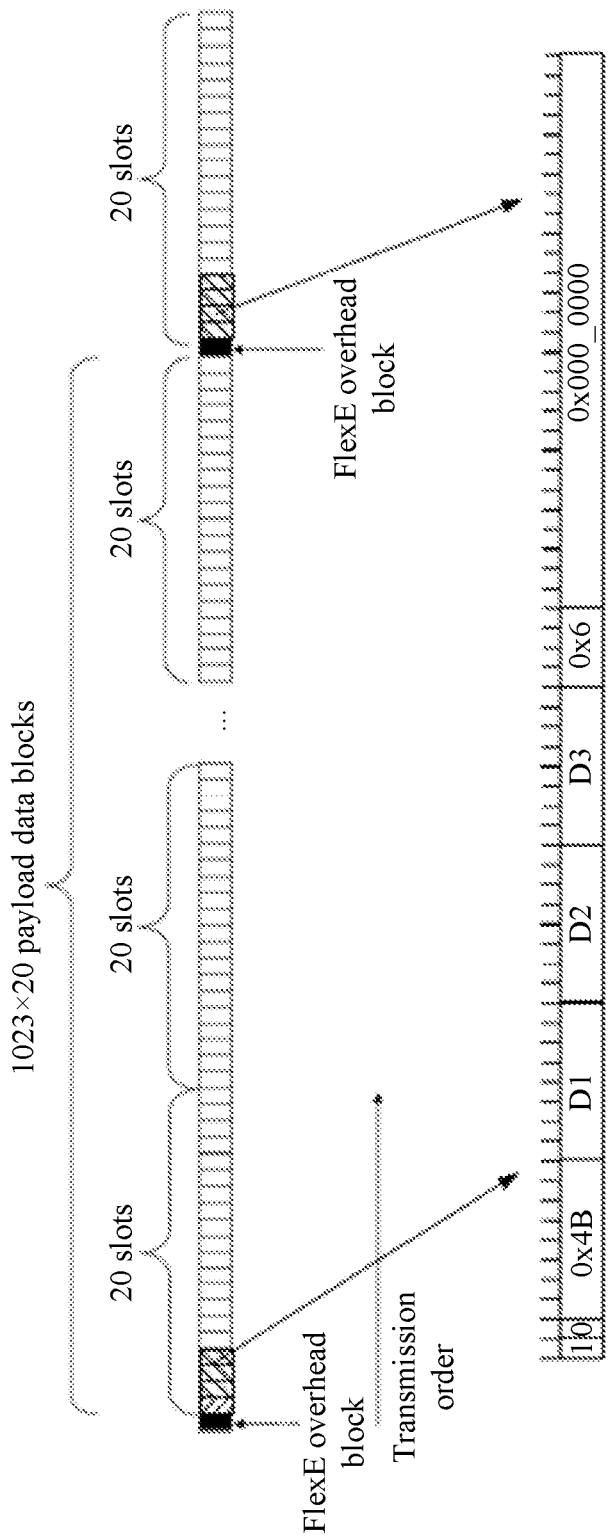
FIG. 11 is a schematic diagram of a structure of a data block according to an embodiment of this application.

Specifically, the delay test request may be transmitted by using several data blocks jointly. For example, as shown in FIG. 11, four 64B/66B data blocks may be used jointly for transmission. For each 64B/66B data block carrying the delay test request, refer to a definition of a structure of a series of 64B/66B encoded blocks in IEEE 802.3-2015. Field 0x6 is to be admitted and assigned by the standard organization, both 0x4B and 0x00 belong to fixed-value fields, and the fixed-value fields may further include 0B10, 0x0, and the like that are used to identify data blocks, so that the far-end device identifies, based on the identities, the data blocks used to transmit the delay test request, and parses the data blocks. In addition to the fixed-value fields, the data block may further include three available bytes D1, D2, and D3 that are used to carry the delay test request. Optionally, to find these data blocks conveniently, the delay test request may be carried, in a specified manner, in a data block adjacent to a FlexE overhead block. It should be understood that the parsing, by the far-end device, the FlexE overhead or the data block carrying the delay test request may be implemented by a control module.

Similarly, when the delay test request is carried on a data block on a PHY link, a field T may be added to the reserved field of the FlexE overhead, to indicate group establishment status information, to be specific, to indicate whether the FlexE group has been established. If the FlexE group is not established, the near-end device sends the delay test request on several continuous FlexE data blocks; or if the FlexE group has been established, no delay test requests are sent in a data block.

When the near-end device puts the delay test request in a data block for transmission by using the foregoing method, the far-end device needs to perform corresponding adjustment when parsing a received data stream. In the prior art, a far-end device parses only a FlexE overhead block at a de-multiplexing stage. In this embodiment, the far-end device further needs to parse the data block carrying the delay test request. To obtain the delay test request through parsing, the far-end device may parse a corresponding data block according to a rule agreed on (for example, specified in a protocol or agreed on by using signaling) in advance; or an overhead block may use a field to indicate a position of the data block carrying the delay test request, or to indicate whether a specified data block adjacent to an overhead block needs to be parsed. The far-end device obtains, through parsing, the corresponding data block based on the indication of the foregoing field after obtaining the overhead block through parsing.

Figure 12:
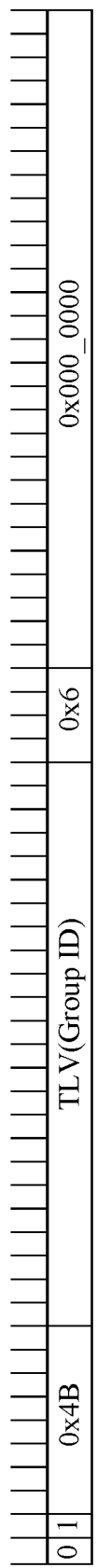
FIG. 12 is a schematic diagram of a structure of a 64B/66B block for transmitting a group ID according to an embodiment of this application.

In this embodiment of this application, the far-end device may encapsulate the group ID into a specified block in a TLV form according to a 64B/66B encoding requirement defined in IEEE 802.3, and send the specified block to the near-end device by using a management channel in the FlexE overhead. FIG. 12 is a schematic diagram of a structure of a 64B/66B block for transmitting a group ID according to an embodiment of this application. As shown in FIG. 12, regarding the 64B/66B block for transmitting the group ID, refer to a definition of a structure of a series of 64B/66B encoded blocks in IEEE802.3-2015. Field 0x6 is to be admitted and assigned by the standard organization, both 0x4B and 0x00 belong to fixed-value fields, the fixed-value fields may further include 0B10, 0x0, and the like, and a remaining three-byte field is used to transmit the group ID.

The foregoing describes, in detail with reference to FIG. 5 to FIG. 12, the flexible Ethernet group establishment method according to the embodiments of this application.

Figure 13:
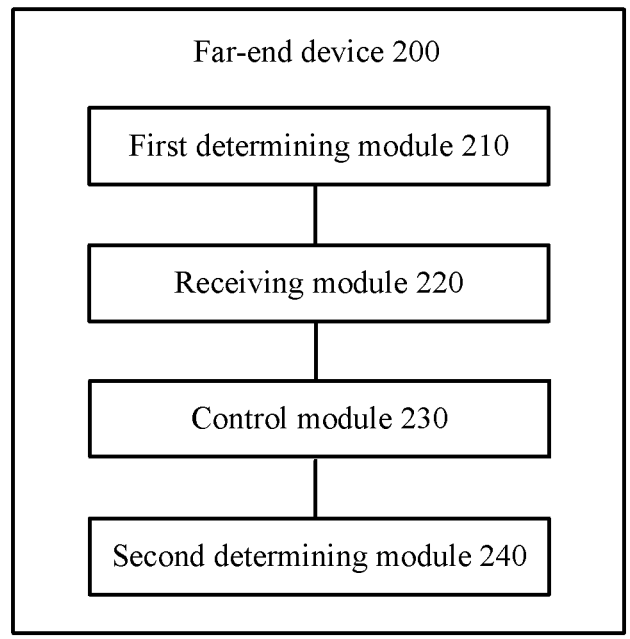
FIG. 13 is a schematic block diagram of a far-end device according to an embodiment of this application.
Figure 14:
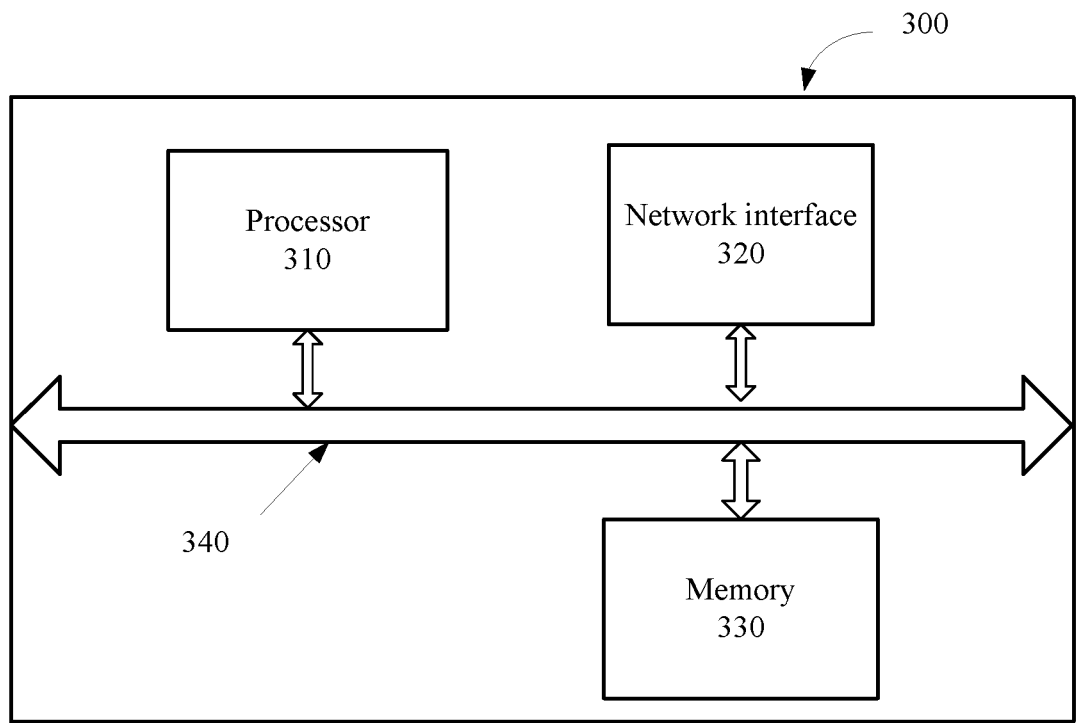
FIG. 14 is a schematic block diagram of a far-end device according to another embodiment of this application.

The following describes, with reference to FIG. 13 and FIG. 14, a far-end device according to the embodiments of this application.

FIG. 13 is a schematic block diagram of a far-end device according to an embodiment of this application. The far-end device 200 shown in FIG. 13 includes a first determining module 210, a receiving module 220, a control module 230, and a second determining module 240.

The first determining module 210 is configured to determine that there are at least M physical layer PHY links, where M is an integer greater than or equal to 2.

The receiving module 220 is configured to receive, over the at least M PHY links determined by the first determining module 210, at least M delay test requests sent by a near-end device, where one delay test request sent by the near-end device is received over each of the at least M PHY links, and an $i^{th}$ delay test request is received over a PHY link i of the at least M PHY links.

The control module 230 is configured to determine at least M receiving time points at which the receiving module 220 receives the at least M delay test requests, where a time point at which the $i^{th}$ delay test request is received is a receiving time point $T_{1i}$.

The second determining module 240 is configured to determine M PHY links used to establish a flexible Ethernet group, from the at least M PHY links based on the at least M receiving time points determined by the control module 230, where a delay difference between any two of the M PHY links: a PHY link a and a PHY link b, satisfies a preset delay condition.

According to the far-end device in this embodiment of this application, the delay difference between the any two PHY links is accurately determined based on time points at which delay test requests are received over any two PHY links. The far-end device can be applicable to a case in which uplink and downlink transmission paths are asymmetric, can be used to establish a flexible Ethernet group, and can ensure a decrease in service failure of the flexible Ethernet group.

Optionally, in an embodiment, at least two of the at least M delay test requests may be sent by the near-end device at different sending time points.

Optionally, in this embodiment of this application, the $i^{th}$ delay test request may include first information. The first information is used to indicate a sending time point $T_{2i}$ at which the near-end device sends the $i^{th}$ delay test request over the PHY link i, and the delay difference $\Delta D_{ab}$ between the PHY link a and the PHY link b is determined by the second determining module 240 based on formula $\Delta D_{ab} = (T_{1b} - T_{2b}) - (T_{1a} - T_{2a})$.

Optionally, in another embodiment, the at least M delay test requests are sent by the near-end device at a same sending time point.

Optionally, in this embodiment of this application, the delay difference $\Delta D_{ab}$ between the PHY link a and the PHY link b is determined by the second determining module 240 based on formula $\Delta D_{ab} = T_{1b} - T_{1a}$.

Optionally, in an embodiment, the delay test request is carried on a management channel block in a flexible Ethernet FlexE overhead on the PHY link i.

Optionally, in another embodiment, the $i^{th}$ delay test request is carried on a data block on the PHY link i.

Optionally, in an embodiment, a FlexE overhead in a FlexE overhead frame transmitted on the PHY link i includes group establishment status information, and the group establishment status information is used to indicate whether the flexible Ethernet group has been established by using the PHY link i.

Optionally, in an embodiment, the far-end device 200 may further include: a sending module 250, configured to send second information to the near-end device, where the second information is used to instruct to use the M PHY links as one flexible Ethernet group; and an establishment module 260, configured to establish the flexible Ethernet group with the near-end device based on the M PHY links.

It should be noted that in this embodiment of this application, the receiving module 220 and the sending module 250 may be implemented by a network interface. The first determining module 210, the control module 230, the second determining module 240, and the establishment module 260 may be implemented by a processor. As shown in FIG. 14, a far-end device 300 may include a processor 310 and a network interface 320.

The processor 310 is configured to determine that there are at least M physical layer PHY links, where M is an integer greater than or equal to 2.

The network interface 320 is configured to receive, over the at least M PHY links determined by the processor 310, at least M delay test requests sent by a near-end device, where one delay test request sent by the near-end device is received over each of the at least M PHY links, and an $i^{th}$ delay test request is received over a PHY link i of the at least M PHY links.

The processor 310 is further configured to determine at least M receiving time points at which the network interface 320 receives the at least M delay test requests, where a time point at which the $i^{th}$ delay test request is received is a receiving time point $T_{1i}$.

The processor 310 is further configured to determine M PHY links used to establish a flexible Ethernet group, from the at least M PHY links based on the at least M receiving time points, where a delay difference between any two of the M PHY links: a PHY link a and a PHY link b, satisfies a preset delay condition.

The far-end device 300 may further include a memory 330 that may be configured to store code and the like executed by the processor 310.

Components of the far-end device 300 are coupled together by using a bus system 340. In addition to a data bus, the bus system 340 further includes a power bus, a control bus, and a status signal bus.

The far-end device 300 shown in FIG. 14 or the far-end device 200 shown in FIG. 13 can implement processes implemented in the embodiments in FIG. 5 to FIG. 12. To avoid repetition, no more details are described herein.

It should be noted that the foregoing method embodiments of this application may be applied to a processor, or implemented by a processor. The processor may be an integrated circuit chip and has a signal processing capability. In an implementation process, steps in the foregoing method embodiments can be implemented by using a hardware integrated logic circuit in the processor, or by using instructions in a form of software. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The methods, steps, and logical block diagrams that are disclosed in the embodiments of this application may be implemented or performed. The general purpose processor may be a microprocessor, or the processor may be any conventional processor or the like. Steps of the methods disclosed with reference to the embodiments of this application may be directly performed and accomplished by a hardware decoding processor, or may be performed and accomplished by a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory ROM), a programmable read-only memory (PROM), an erasable programmable read-only memory (EPROM), an electrically erasable programmable read-only memory (EEPROM), or a flash memory. The volatile memory may be a random access memory (Random Access Memory, RAM) used as an external cache. Through example but not limitative description, many forms of RAMs may be used, for example, a static random access memory (SRAM), a dynamic random access memory (DRAM), a synchronous dynamic random access memory (, SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any other proper types of memories.

Optionally, in an embodiment, at least two of the at least M delay test requests are sent by the near-end device at different sending time points.

Optionally, in this embodiment of this application, the $i^{th}$ delay test request includes first information. The first information is used to indicate a sending time point $T_{2i}$ at which the near-end device sends the $i^{th}$ delay test request over the PHY link i, and the delay difference $\Delta D_{ab}$ between the PHY link a and the PHY link b is determined by the processor 310 based on formula $\Delta D_{ab}=(T_{1b}-T_{2b})-(T_{1a}-T_{2a})$.

Optionally, in another embodiment, the at least M delay test requests are sent by the near-end device at a same sending time point.

Optionally, in this embodiment of this application, the delay difference $\Delta D_{ab}$ between the PHY link a and the PHY link b is determined by the processor 310 based on formula $\Delta D_{ab}=T_{1b}-T_{1a}$.

Optionally, in an embodiment, the delay test request is carried on a management channel block in a flexible Ethernet FlexE overhead on the PHY link i.

Optionally, in another embodiment, the $i^{th}$ delay test request is carried on a data block on the PHY link i.

Optionally, in an embodiment, a FlexE overhead in a FlexE overhead frame transmitted on the PHY link i includes group establishment status information, and the group establishment status information is used to indicate whether the flexible Ethernet group has been established by using the PHY link i.

Optionally, in an embodiment, the network interface 320 is further configured to send second information to the near-end device. The second information is used to instruct to use the M PHY links as one flexible Ethernet group. The processor 310 is further configured to establish the flexible Ethernet group with the near-end device based on the M PHY links.

It should be understood that "one embodiment" or "an embodiment" mentioned throughout the specification means that specified features, structures, or characteristics related to the embodiment are included in at least one embodiment of this application. Therefore, "in one embodiment" or "in an embodiment" appearing throughout the specification does not necessarily refer to a same embodiment. In addition, these specified features, structures, or characteristics may be combined in one or more embodiments in any appropriate manner.

It should be understood that, in the embodiments of this application, sequence numbers of the foregoing processes do not mean execution sequences. The execution sequences of the processes should be determined according to functions and internal logic of the processes, and should not be construed as any limitation on the implementation processes of the embodiments of this application.

It should be understood that in the embodiments of this application, "B corresponding to A" indicates that B is associated with A, and B may be determined according to A. However, it should further be understood that determining B according to A does not mean that B is determined according to A only, that is, B may be further determined according to A and/or other information.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, units and algorithm steps in the examples described with reference to the embodiments disclosed in this specification may be implemented by electronic hardware or a combination of computer software and electronic hardware. Whether the functions are performed by hardware or software depends on specified applications and design constraints of the technical solutions. A person skilled in the art may use different methods to implement the described functions for each specified application, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiments, and no details are repeated herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed.

In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A flexible Ethernet group establishment method, comprising:
    determining, by a far-end device, that there are at least M physical layer (PHY) links, wherein M is an integer greater than or equal to 2;
    receiving, by the far-end device over the at least M PHY links, at least M delay test requests sent by a near-end device, wherein one delay test request sent by the near-end device is received over each of the at least M PHY links, and an $i^{th}$ delay test request is received over a PHY link i of the at least M PHY links;
    determining, by the far-end device, at least M receiving time points at which the at least M delay test requests are received, wherein a time point at which the $i^{th}$ delay test request is received is a receiving time point $T_{1i}$; and
    determining, by the far-end device, M PHY links used to establish a flexible Ethernet group, from the at least M PHY links based on the at least M receiving time points, wherein a delay difference between any two of the M PHY links: a PHY link a and a PHY link b, satisfies a preset delay condition.

2. The method according to claim 1, wherein at least two of the at least M delay test requests are sent by the near-end device at different sending time points.

3. The method according to claim 2, wherein the $i^{th}$ delay test request comprises first information, the first information is used to indicate a sending time point $T_{2i}$ at which the near-end device sends the $i^{th}$ delay test request over the PHY link i, and the delay difference $\Delta D_{ab}$ between the PHY link a and the PHY link b is determined based on a formula $\Delta D_{ab}=(T_{1b}-T_{2b})-(T_{1a}-T_{2a})$.

4. The method according to claim 1, wherein the at least M delay test requests are sent by the near-end device at a same sending time point.

5. The method according to claim 4, wherein the delay difference $\Delta D_{ab}$ between the PHY link a and the PHY link b is determined based on a formula $$\Delta D_{ab}=T_{1b}-T_{1a}.$$

6. The method according to claim 1, wherein the $i^{th}$ delay test request is carried on a management channel block in a flexible Ethernet FlexE overhead on the PHY link i.

7. The method according to claim 6, wherein a FlexE overhead in a FlexE overhead frame transmitted on the PHY link i comprises group establishment status information, and the group establishment status information is used to indicate whether the flexible Ethernet group has been established using the PHY link i.

8. The method according to claim 1, wherein the $i^{th}$ delay test request is carried on a data block on the PHY link i.

9. The method according to claim 1, wherein the method further comprises:
 sending, by the far-end device, second information to the near-end device, wherein the second information is used to instruct to use the M PHY links as one flexible Ethernet group; and
 establishing, by the far-end device, the flexible Ethernet group with the near-end device based on the M PHY links.

10. A far-end device, comprising:
 a processor, configured to determine that there are at least M physical layer (PHY) links, wherein M is an integer greater than or equal to 2; and
 a network interface, configured to receive, over the at least M PHY links determined by the processor, at least M delay test requests sent by a near-end device, wherein one delay test request sent by the near-end device is received over each of the at least M PHY links, and an $i^{th}$ delay test request is received over a PHY link i of the at least M PHY links;
 wherein the processor is further configured to determine at least M receiving time points at which the receiving module receives the at least M delay test requests, wherein a time point at which the $i^{th}$ delay test request is received is a receiving time point $T_{1i}$; and
 wherein the processor is further configured to determine M PHY links used to establish a flexible Ethernet group, from the at least M PHY links based on the at least M receiving time points determined by the control module, wherein a delay difference between any two of the M PHY links: a PHY link a and a PHY link b, satisfies a preset delay condition.

11. The far-end device according to claim 10, wherein at least two of the at least M delay test requests are sent by the near-end device at different sending time points.

12. The far-end device according to claim 11, wherein the $i^{th}$ delay test request comprises first information, the first information is used to indicate a sending time point $T_{2i}$ at which the near-end device sends the $i^{th}$ delay test request over the PHY link i, and the delay difference $\Delta D_{ab}$ between the PHY link a and the PHY link b is determined by the processor based on a formula $\Delta D_{ab}=(T_{1b}-T_{2b})-(T_{1a}-T_{2a})$.

13. The far-end device according to claim 10, wherein the at least M delay test requests are sent by the near-end device at a same sending time point.

14. The far-end device according to claim 13, wherein the delay difference $\Delta D_{ab}$ between the PHY link a and the PHY link b is determined by the processor based on a formula $\Delta D_{ab}=T_{1b}-T_{1a}$.

15. The far-end device according to claim 10, wherein the $i^{th}$ delay test request is carried on a management channel block in a flexible Ethernet FlexE overhead on the PHY link i.

16. The far-end device according to claim 15, wherein a FlexE overhead in a FlexE overhead frame transmitted on the PHY link i comprises group establishment status information, and the group establishment status information is used to indicate whether the flexible Ethernet group has been established using the PHY link i.

17. The far-end device according to claim 10, wherein the $i^{th}$ delay test request is carried on a data block on the PHY link i.

18. The far-end device according to claim 10, wherein the network interface is further configured to send second information to the near-end device, wherein the second information is used to instruct to use the M PHY links as one flexible Ethernet group; and
 wherein the processor is further configured to establish the flexible Ethernet group with the near-end device based on the M PHY links.

19. A far-end device, comprising:
 a processor, configured to determine that there are at least M physical layer (PHY) links, wherein M is an integer greater than or equal to 2; and
 a network interface, configured to receive, over the at least M PHY links determined by the processor, at least M delay test requests sent by a near-end device, wherein one delay test request sent by the near-end device is received over each of the at least M PHY links, and an $i^{th}$ delay test request is received over a PHY link i of the at least M PHY links;
 the processor is further configured to determine at least M receiving time points at which the network interface receives the at least M delay test requests, wherein a time point at which the $i^{th}$ delay test request is received is a receiving time point $T_{1i}$; and
 the processor is further configured to determine M PHY links used to establish a flexible Ethernet group, from the at least M PHY links based on the at least M receiving time points, wherein a delay difference between any two of the M PHY links: a PHY link a and a PHY link b, satisfies a preset delay condition.

20. The far-end device according to claim 19, wherein the network interface is further configured to send second information to the near-end device, and the second information is used to instruct to use the M PHY links as one flexible Ethernet group; and the processor is further configured to establish the flexible Ethernet group with the near-end device based on the M PHY links.

* * * * *